Figure 1:
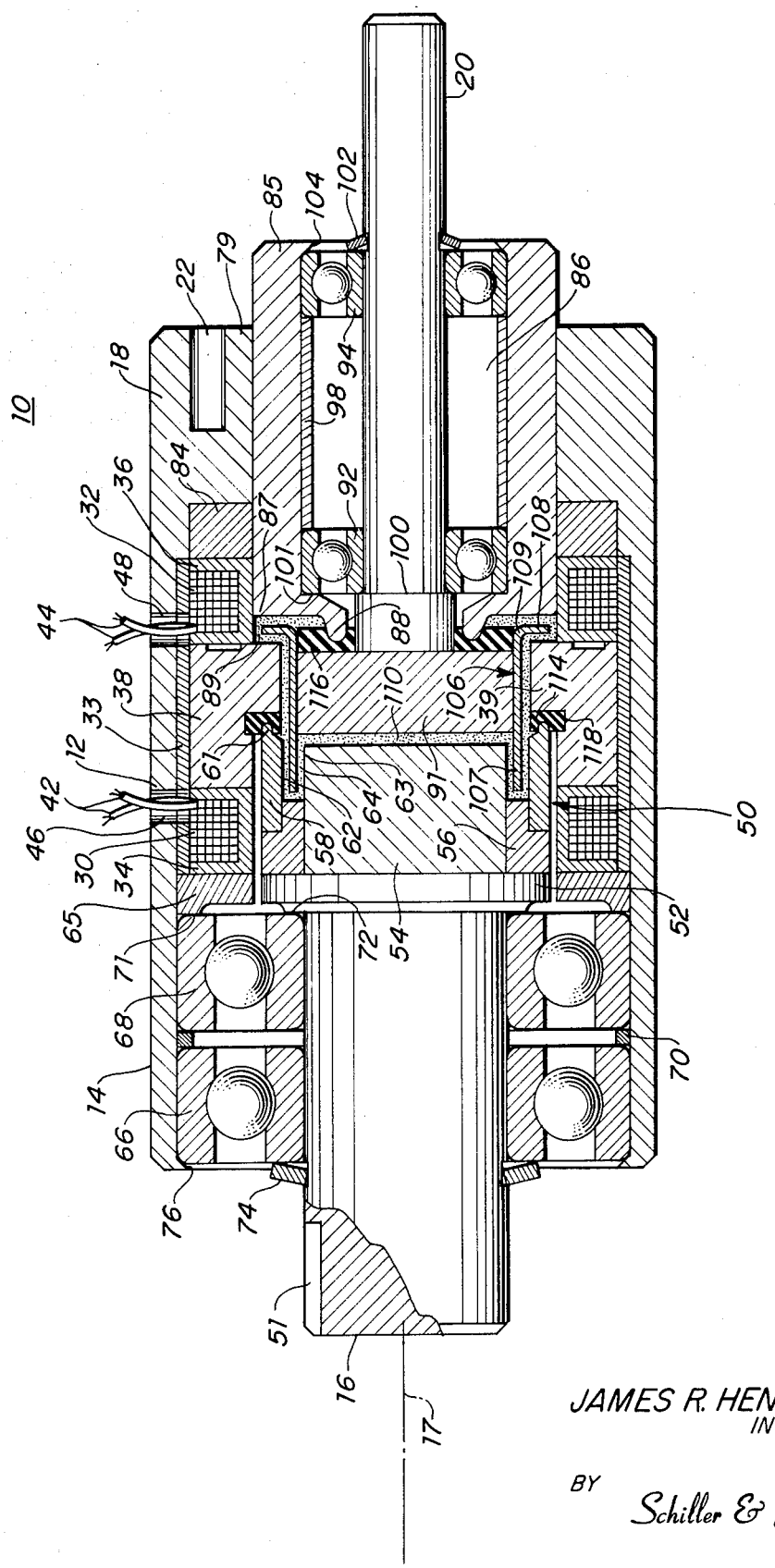

ously coincidental with, the axis

United States Patent
Hendershot

[15] 3,672,476
[45] June 27, 1972

[54] ELECTROMAGNETIC CLUTCH-BRAKE DEVICES

[72] Inventor: James R. Hendershot, Amherst, N.H.
[73] Assignee: Vibrac Corporation, Chelmsford, Mass.
[22] Filed: Sept. 4, 1970
[21] Appl. No.: 69,839

[52] U.S. Cl............................192/21.5, 192/12 D, 192/17 C
[51] Int. Cl..........................................................F16d 37/02
[58] Field of Search............................192/21.5, 17 C, 12 D

[56] References Cited

UNITED STATES PATENTS

| | | |
|---|---|---|
| 2,948,371 | 8/1960 | Lehde....................................192/21.5 |
| 3,450,238 | 5/1969 | Adkins..................................192/21.5 |

Primary Examiner—William F. O'Dea
Assistant Examiner—Randall Heald
Attorney—Schiller & Pandiscio

[57] ABSTRACT

A combination magnetic particle clutch and brake device comprising a rotatable output shaft having a single magnetic coupling member mounted thereon for rotation therewith, the coupling member comprising a hollow cylindrical portion having an axis of rotation substantially coincidental with, the axis of rotation of the shaft and an annular portion extending substantially radially of the cylindrical portion. The brake section of the device includes a stationary magnetic armature and one of the portions of the member, while the clutch section includes a rotor and a stator and the other of the portions of the member. Means connect the stationary armature and the stator as a unit. Driving coils are provided for establishing magnetic flux paths through the armature and one portion of the coupling member and through the rotor and stator and the other portion of the coupling member. The armature and the rotor are spaced from and surround the coupling member so as to define a single continuous space which is filled with magnetic particles. Sealing means are provided for substantially preventing magnetic particles from escaping from the space.

18 Claims, 2 Drawing Figures

JAMES R. HENDERSHOT
INVENTOR.

BY Schiller & Pandiscio

ATTORNEYS.

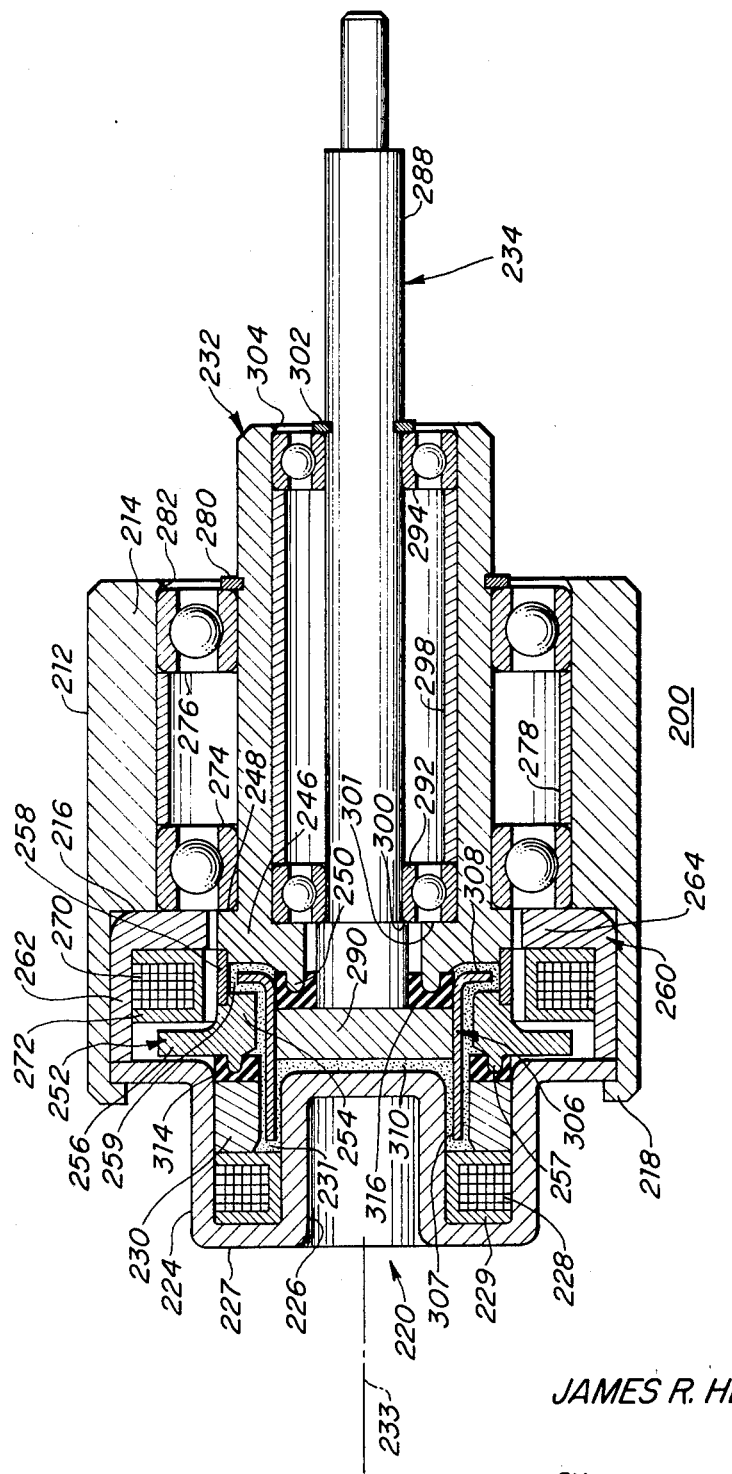

ELECTROMAGNETIC CLUTCH-BRAKE DEVICES

This invention relates to magnetic torque transmitting devices and more particularly to those devices employing magnetic particles in a combined clutch and brake assembly.

Magnetic particle devices of various types are well known to the art. Most commonly they are constructed to function as quick-acting, electrically actuated clutches or brakes. Combination magnetically energized clutch and brake devices are also known in the art and are extremely useful in providing quick-response, selectively energizable combination clutch and brake units which may be employed, for example, in a tape drive mechanism. The present invention is concerned with an improvement that greatly simplifies the construction and assembly, as well as the accuracy and reliability of such combination magnetic particle clutch and brake assemblies. Typically prior devices of the type to which the invention relates consist of a single rotatably mounted output shaft having two or more coupling members in the form of radially extending discs that rotate therewith. The brake assembly of such prior devices consists of first and second stationary members mounted about one of the discs with a spacing therebetween which is filled with magnetic particles, plus a coil to selectively establish a magnetic flux between the stationary members and the disc in order to magnetically lock the particles and prevent relative rotation between the disc and the stationary magnetic members. The clutch assembly of such devices comprises a rotor structure mounted about but spaced from another of the discs, with the intervening spaces being filled with magnetic particles. The clutch assembly is provided with a coil to selectively establish a magnetic flux between the rotor structure and the associated disc in order to lock the particles into torque-transmitting chains coupling the disc and rotor structure. The rotor serves as an input or driving member to impart rotation to the output shaft when the clutch coil is energized. Bearing assemblies are provided at the ends and intermediate the ends of the unit for permitting rotation of the rotor structure and the output shaft. Sealing means are provided for preventing the escape of particles from the spaces. Because of the construction of such prior art devices at least four sealing members are usually required. Such prior devices are relatively large and are too expensive for use in mini-computers and other computer peripheral equipment where size and cost as well as lifetime are critical factors.

Accordingly, an object of the present invention is to provide a combination magnetic particle clutch and brake assembly which is relatively simple to construct and assemble.

Another object of this invention is to provide a combination magnetic particle clutch and brake assembly which is very small and compact.

Still another object of the present invention is to provide a combination magnetic particle clutch and brake assembly which is relatively inexpensive compared to other combination magnetic particle clutch and brake devices.

Yet another object of the present invention is to provide a combination magnetic particle clutch and brake assembly which is especially suited for use in mini-computers and other computer peripheral equipment.

A further object of the present invention is to provide a combination magnetic particle clutch and brake device in which a single integral coupling member, which may be stamped or drawn, serves both the clutch and brake stages.

Another object of the present invention is to provide a combination magnetic particle clutch and brake assembly which has only a single continuous magnetic-particle-filled space for both the clutch and brake units.

Still a further object of the present invention is to provide a combination magnetic particle clutch and brake assembly in which the brake gap may be inspected during assembly for proper spacing.

Yet a further object of the present invention is to provide a combination magnetic particle clutch and brake assembly which requires only two seals of simple construction, rather than the usual four, for preventing particles from escaping from the magnetic-particle-filled space.

The above objects, advantages and features of the present invention, as well as others, may be accomplished by providing in a combination magnetic particle clutch and brake device having rotatable input and output shafts, a brake unit including a stationary magnetic armature, a clutch unit including a rotor and a stator, means connecting the armature and the stator as a unit, and driving coils for establishing magnetic flux paths for the clutch unit and the brake unit, the improvement comprising a novel single magnetic coupling member mounted on one of said shafts for rotation therewith. The coupling member comprises two portions, one serving the brake unit and the other serving the clutch unit. The coupling member is shaped and disposed so as to provide spaces between adjacent cooperating portions of the clutch and brake unit which are filled with magnetic particles. The magnetic flux established by the brake coil has a path through the magnetic particles, the armature and one of the portions of the coupling member, while the flux established by the clutch coil has a path through the magnetic particles, the rotor and stator and the other of the portions of the coupling member. Only two resilient seals are required to prevent leakage of the magnetic particles.

Other objects and many of the attendant advantages of this invention are believed to be apparent from the following specification which is to be considered together with the accompanying drawings, wherein:

FIG. 1 is a longitudinal partial sectional view of a combination magnetic particle clutch and brake assembly constituting a preferred embodiment of the present invention; and FIG. 2 is a longitudinal partial sectional view of a combination magnetic particle clutch and brake assembly constituting an alternative embodiment of the present invention.

Turning now to FIG. 1 there is illustrated a combination magnetic particle clutch and brake device 10 comprising a cylindrical clutch/brake stator housing 12 providing at one end 14 thereof a support for a rotatable input shaft 16 having an axis of rotation 17. Housing 12 is made of non-magnetic material. The other end 18 of housing 12 provides a support for an output shaft 20. End 18 has an opening 22 therein which is used as a mounting pilot for the assembly 10.

A pair of annular field coils 30 and 32 each wound around bobbins 34 and 36 respectively and of known construction are secured in housing 12. An annular magnetic sleeve 33 extends axially around both coils 32 and 34 along the inner wall of housing 12. Both bobbins 34 and 36 abut opposing faces of an intervening annular ring 38 which extends inwardly from the wall of housing 12. Ring 38 has a portion 39 that projects inwardly toward axis 17 further than the rest of ring 38. Bobbin 34 is held in abutting position with one face of ring 38. Bobbin 36 is held in abutting position with another face of ring 38 opposite that against which bobbin 34 abuts. Ring 38 is made of magnetic material and also functions as a stator pole. The opposite ends of coils 30 and 32 are each connected to pairs of leads 42 and 44 respectively which project out of housing 12 through suitable openings 46 and 48 respectively. Leads 42 and 44 are used to couple coils 30 and 32 to an external power source (not shown) whereby they may be energized.

The input stage of the device includes an input rotor 50 at the inner end of input shaft 16. The latter is made of magnetic material and its outer end has a keyway 51 formed on the outer surface thereof which allows it and rotor 50 to be coupled to a source of torque input. With respect to the rotor 50, the shaft 16 is formed with a peripheral flange 52 and a reduced diameter cylindrical extension 54 on which is affixed an annular spacer 56 which is L-shaped in longitudinal section. Spacer 56 engages flange 52. Affixed to spacer 56 is a cylindrical member 58 which is spaced radially from extension 54. Spacer 56 and member 58 may be secured to each other and to shaft 16 by a press fit or by other suitable means. The free end of member 58 (which forms part of rotor 50) has a bull-nose extension 61 on one end thereof. Bull-nose extension 61 has a substantially rounded end but other configurations may be employed such as a flat end, a saddled end, etc.

The function of bull-nose extension 61 will be explained later. The cylindrical member 58 is made of the same magnetic material as shaft 16 so that it and extension 54 can function as armature members or poles of the clutch, while spacer 56 is made of a non-magnetic material. The member 58 and shaft extension 54 have confronting axially extending inner and outer surfaces 62 and 63 respectively, which are spaced from one another as a result of spacer 56 to define an axially extending space or gap 64 and function as poles to direct a magnetic field through a selected portion of the output stage of the clutch unit. Mounted within housing 12 concentric with but spaced from flange 52 of shaft 16 is an annular member 65 which is made of magnetic material and functions as a stator pole. At this point it is to be noted that sleeve 33 functions as part of the stator of the clutch unit and part of the brake unit. One side of member 65 engages and holds bobbin 34 against the adjacent side surface of the inwardly extending ring 38.

Shaft 16 is rotatably supported in housing 12 by means of a bearing assembly comprising a pair of bearings 66 and 68 separated by a bearing spacer 70. The exact positions of bearings 66 and 68 are determined at one end by a side face 71 of member 65 and a shoulder 72 on the flange 52 of shaft 16 against which bearing 68 abuts. The inner race of bearing 66 is held in firm position by a retainer ring 74 which snaps into a groove formed on the outer surface of shaft 16. The outer race of the bearing is held by a staked portion 76 at the end 14 of housing 12. It is to be noted that staking as at 76 is for convenience and that the same result could be achieved by means of a snap ring or by a threaded nut screwed onto and locked to housing 12. The bearings 66 and 68 and spacer 70 are all held firmly in position as above described without necessity for shimming any of the parts. This arrangement also serves to keep annular member 65 tight against bobbin 34 to hold it in engagement with ring 38. It is essential that the retainer ring 74 be made so that when inserted in the groove in shaft 16 it will provide sufficient axial force to properly preload bearings 66 and 68. Preferably it is formed with a cross-sectional bow as shown. However, it also could be wavy like a wavy-spring washer or wedged-shaped in cross-section so as to take up all play and eliminate the need for shims.

The end 18 of housing 12 has a reduced inner diameter to provide a portion 79 in which is mounted the output stage of the device. The output stage includes output shaft 20 which is constructed of a suitable non-magnetic material such as stainless steel. Output shaft 20 is mounted in axial alignment with axis 17 of input shaft 16. Mounted on the inner wall of housing 12 between bobbin 36 and the portion 79 is a ring 84 which is made of magnetic material and serves as a part of the stator of the brake unit. Ring 84 also serves to maintain bobbin 36 in proper position. A cylindrical sleeve armature 85 is mounted in portion 79 of the housing in axial alignment with shaft 16. Armature 85 is fixed against rotation by, for example, being press fitted into position in portion 79 of the housing. Armature 85 is made of a magnetic material and serves as a stator pole for the brake unit as will be described. Armature 85 also provides a means for supporting output shaft 20. The inner end of armature 85 has a bull-nose extension 88 which is substantially the same as bull-nose extension 61 of the outer portion 56 of rotor 50. Armature 85 is disposed in housing 12 so that a radially extending space or gap 89 exists between its end surface 87 and the portion 39 of ring 38. The inner end of shaft 20 has an enlarged diameter cylindrical portion 91. All of shaft 20 including portion 91 is made of a non-magnetic material such as, for example, stainless steel.

Output shaft 20 is rotatably supported by means of a bearing assembly comprising a pair of bearings 92 and 94 located between its outer surface and the inner wall of armature 85, the two bearings are separated from each other by a bearing spacer 98. It is to be noted that the number of bearings used may vary depending upon what is required to support the external load applied to shaft 20 (the same thing is true with respect to the bearings supporting shaft 16). The inner race of bearing 92 engages a shoulder 100 which is an integral part of shaft 20, while its outer race engages a shoulder 101 on the back side of bull-nose extension 88 of sleeve armature 85. The inner race of bearing 94 is held in firm position by a retainer ring 102 which snaps into a groove formed on the outer surface of shaft 20, while its outer race is held against axial movement by a staked portion 104 on the outer end of armature 85. The staking at 104 could be omitted and the same result achieved by means of a retaining ring mounted in armature 85 or a nut screwed onto and locked to the end of armature 85. Retainer ring 102 is of the same type as ring 74 and could be replaced by some other means such as a nut if the end of shaft 20 were threaded. Bearings 92 and 94 and bearing spacer 98 are all firmly held in position as shown without necessity for shimming any of the parts.

Affixed to the peripheral surface of cylindrical portion 91 of shaft 20 is a coupling member 106 which is L-shaped in longitudinal section. Member 106 is made of magnetic material and functions as both part of the clutch unit and the brake unit as will be explained. Member 106 is coaxial with shaft 20 and comprises tow integrally formed portions, an axially extending hollow, cylindrical portion 107 and a radially extending annular portion 108. Annular portion 108 extends from an end 109 of cylindrical portion 107 substantially orthogonally with respect to cylindrical portion 107 and axis 17. Although annular portion 108 is shown as being disposed at exactly 90° with respect to and extending away from axis 17, it should be understood that portion 108 may be disposed at some other angle with respect to the axis other than exactly 90°. Member 106 may be stamped or drawn and may be affixed to cylindrical portion 91 of shaft 20 by press fitting, welding, brazing, inductive soldering, staking, or in any other suitable manner. Cylindrical portion 107 of member 106 extends into the axial gap 64 between and spaced from the inner and outer portions 54 and 58 of rotor 50. Cylindrical portion 107 serves as part of the clutch unit in that it rotates together with rotation of input shaft 16 and rotor 50 when coil 30 is energized to establish a magnetic field as hereinafter described. Annular portion 108 of member 106 extends into the radial gap 89 between and spaced from the end surface 87 of sleeve armature 85 and the projection 39 of ring 38. This annular portion 108 serves as part of the brake unit in that it remains fixed against rotation and is magnetically coupled to output shaft 20 when coil 32 is energized to establish a magnetic field as hereinafter described.

The axial gap 64 and the radial gap 89 define a single continuous space which is filled with dry magnetic particles 110. Radial gap 89 is fixed in size by the relative dimensioning of the associated components. The extent to which annular portion 108 of member 106 extends into radial gap 89 is also substantially fixed by the relative dimensioning of the associated components. The amount that the cylindrical portion 107 of member 106 extends into axial gap 64 is not especially critical and may vary by as much as 10 percent or more without any substantial change in torque.

Although prior art combination clutch and brake assemblies with separate clutch and brake gaps, only two seals modules generally require four members for sealing the clutch and brake gaps, only two seals 114 and 116 of simple construction are required for sealing the single continuous space defined by gaps 64 and 89 to prevent the escape of magnetic particles 110. Seals 114 and 116 are simple washers which may be made of a suitable resilient sealing material such as rubber or plastic-impregnated felt. Washer seal 114 is positioned and confined radially in a groove 118 in the inner wall of ring 38 and is pressed axially against the adjacent surface of projection 39 of ring 38 by the bull-nose extension 61 of rotor 50. The rounded end of bull-nose 61 compresses washer seal 114 with sufficient force to provide a good seal against escape of magnetic particles 110 with minimal drag imparted to the rotation of rotor 50. Washer seal 116 is pressed axially against enlarged cylindrical portion 91 of shaft 20 and radially is confined between the cylindrical portion 107 of member 106 and the section of shaft 20 immediately adjacent portion 91. The rounded end of bull-nose extension 88 of armature 85 compresses washer 116 axially with sufficient force to provide a good seal against escape of magnetic particles 110 with minimal drag imparted to the rotation of output shaft 20. As mentioned earlier the preferred shape of the end of bull-nose extensions 61 and 88 is rounded since the smaller the surface area engaging the washer seals, the less the rotational drag. However, various other end configurations for the bull-nose extensions would also be operative.

As noted above, the ring 38, annular member 65, ring 84, and sleeve 33 are all made of magnetic material. These members may be of solid construction or may be laminated to reduce eddy currents. As an alternative measure, the housing 12 may be made of magnetic material, in which case one or more of the foregoing magnetic members could be integral parts of the housing.

Operation of the above-described device will now be explained. When coil 30 is energized via leads 42, a magnetic field is established across the particles 110 in axial gap 64 through the annular member 65, sleeve 33, ring 38, rotor member 58, cylindrical portion 107 of coupling member 106, extension 54 of shaft 16, and flange 52 of shaft 16. With such flux linkage across the particles 110, the latter will lock in chains between rotor member 58, the cylindrical portion 107 of coupling member 106 and extension 54 of shaft 16, thereby coupling the input shaft 16 to output shaft 20. The transmitted torque is controllable by varying the strength of the magnetic field. Once the clutch unit is operating as described above, if it is desired to brake the rotation of output shaft 20, coil 30 is deenergized while coil 32 via leads 44 is simultaneously energized. With energization of coil 32 a magnetic field is established across the particles 110 in radial gap 89 through ring 38, sleeve 33, ring 84, armature 85 and the annular portion 108 of coupling member 106. The flux linkage across particles 110 will cause them to lock in chains between armature 85, annular portion 108 of coupling member 106, and ring 38, whereby output shaft 20 is braked. The clutch and brake units both have very fast response, making the device suitable for fast response applications as, for example, magnetic tape drive units, and mini-computer peripheral equipment.

In the embodiment shown in FIG. 1 the cylindrical portion 107 of coupling member 106 serves as part of the clutch unit and the annular portion 108 of coupling member 106 serves as part of the brake unit. However, it also is possible, as shown in FIG. 2, to construct the clutch-brake device so that the cylindrical portion of the coupling member serves as part of the brake unit and the annular portion serves as part of the clutch unit.

FIG. 2 shows a combination magnetic particle clutch and brake assembly 200 which includes a cylindrical housing 212 made of nonmagnetic material. One portion 214 of housing 212 has a reduced internal diameter so as to provide a shoulder 216. Staked at 218 at the left end of housing 212 is a base 220 which has an outer side wall 224, an inner concentric side wall 226 and an end wall 227. Base 220 is made of magnetic material and serves as an armature or stator pole for the brake unit as will be described. Positioned between side walls 224 and 226 and against end wall 227 is a brake driver coil 228 which is wound around a bobbin 229 made of an electrical insulating material. Located in fixed position on the inside surface of outer side wall 224 is an annular ring 230 made of magnetic material which serves as a stator pole. Stator pole 230 and inner side wall 226 define an axial space or gap 231 therebetween. Side walls 224 and 226 are axially positioned with respect to an axis of rotation 233 around which cylindrically shaped input and output shafts 232 and 234 respectively rotate. Input and output shafts 232 and 234 are concentrically located and spaced from one another.

The inner end of input shaft 232 has both an enlarged diameter section 246 which provides an outside shoulder 248 and an inside shoulder 301. This section 246 also has a bull-nose extension 250 which is identical to the bull-nose extensions described in FIG. 1. Input shaft 232 is made of magnetic material and serves as a rotor for the clutch unit of assembly 200. The clutch unit also includes a rotor cap 252 which is a magnetic, annular member having an axial portion 254, and a radially extending portion 256. Radially extending portion 256 projects outwardly away from axis 233 and axial portion 254 is connected to shaft 232 by a nonmagnetic spacer 258 which may be press fitted to hold portion 254 and shaft 232 in fixed relation with respect to one another to define a radial space or gap 259 therebetween. On the left end of axial portion 254 or cap 252 is a bull-nose extension 257. Shaft 232 and cap 252 rotate together as a unit serving as the entire rotor assembly for the clutch unit. A stator ring 260 is provided for the clutch unit and is made of magnetic material. Stator 260 is positioned within and secured to housing 212 and has an axially extending cylindrical portion 262 which may be press-fitted on the inside wall of housing 12 and a radial, inwardly extending annular portion 264 which abuts shoulder 216 of housing 212. Radial portion 264 of stator 260 is spaced from and concentric with enlarged portion 246 of input shaft 232. Mounted within stator ring 260 is a clutch driver coil 270 wound around a bobbin 274 similar to bobbin 229. Bobbin 272 may be secured in place by various means, preferably by means of a press fit with respect to stator ring 260.

Input shaft 232 is hollow and is rotatably supported inside housing 212 by a bearing assembly located between it and the inside surface of portion 214 of the housing. This bearing assembly includes a pair of bearings 274 and 276 which are spaced apart by a bearing spacer 278. The outer race of bearing 274 bears against radial portion 264 of stator ring 260 while the inner race abuts shoulder 248 of shaft 232. Bearing 276 and spacer 278 are held in position by a retainer ring 280, which is snapped into a groove in the outer surface of shaft 232, and a staked portion 282 at the end of portion 214 of housing 212.

Output shaft 234 has an outer end 288 which extends beyond outer end of input shaft 232. The inner end of shaft 234 has an enlarged diameter cylindrical portion 290. All of shaft 234 including portion 290 is made of a suitable nonmagnetic material such as stainless steel. Output shaft 234 is rotatably supported within input shaft 232 by means of a bearing assembly comprising a pair of bearings 292 and 294 separated from each other by a bearing spacer 298. It is to be noted that the number of bearings used to support shafts 232 and 234 may vary depending upon what is required to support the external loads applied thereto. The inner race of bearing 292 engages a shoulder 300 which is in integral part of shaft 234 adjacent portion 290, while its outer race engages the internal shoulder 301 of shaft 232. The inner race of bearing 294 is held in firm position by a retainer ring 302 which snaps into a groove formed on the outer surface of shaft 234, while its outer race is held against axial movement by a staked portion 304 on the outer end of shaft 232. The staking at 204 could be omitted and the same result achieved by means of a retaining ring mounted in shaft 232 or a nut screwed onto and locked to the end of shaft 232. Retainer ring 302 is of the same type as ring 280 and could be replaced by some other means such as a nut if the end of shaft 234 were threaded. Bearings 292 and 294 and bearing spacer 298 are all firmly held in position between shoulder 300 and shoulder 301 at one end and retainer ring 302 and staked portion 304 at the other end without necessity for shimming any of the parts.

Mounted on the periphery of cylindrical portion 290 of shaft 234 is a single coupling member 306 which is L-shaped in cross-section. Member 306 is made of magnetic material and functions as both part of the clutch unit and the brake unit as will be explained. Member 306 comprises tow integrally formed portions, an axially extending hollow, cylindrical portion 307, which has an axis of rotation substantially coincidental with axis 233, and a radially extending annular portion 308. Although annular portion 308 is shown as being disposed at exactly 90° with respect to and extending away from axis 233, it should be understood that portion 308 may be disposed at some other angle with respect to the axis other than exactly 90°. Member 306 may be stamped or drawn and may be affixed to cylindrical portion 290 of shaft 234 by press fitting, welding, brazing, inductive soldering, staking or in any other suitable manner. Cylindrical portion 307 of member 306 extends into the axial gap 231 in spaced coaxial relation with stator pole 230 and the inner side wall 226 of base 220, and thus serves as part of the brake unit when brake coil 228 is energized. Annular portion 308 of member 306 extends into radial gap 259 in spaced relation to section 246 of shaft 252 and rotor cap 252. Annular portion 308 serves as part of the clutch unit in that it serves to couple input shaft 232 to output shaft 234 when clutch driver coil 270 is energized.

Axial gap 231 and radial gap 259 define a single continuous space which is filled with dry magnetic particles 310. Radial gap 259 is fixed in size by the relative dimensioning of the associated components. The extend to which annular portion 308 of member 306 extends into radial gap 259 is also substantially fixed by the relative dimensioning of the associated components and no shimming is required. The amount that the cylindrical portion 307 of member 306 extends into axial gap 231 is not critical and may vary by as much as 10 percent or more without any substantial change in torque.

Although prior art combination clutch and brake assemblies with separate clutch and brake modules generally require four members for sealing the clutch and brake gaps, only two seals 314 and 316 of simple construction are required for sealing the single continuous space defined by gaps 231 and 259 to vent escape of magnetic particles 310. Seals 314 and 316 are simple washers which may be made of a suitable resilient sealing material such as rubber or plastic-impregnated felt. Washer seal 314 is positioned and confined radially by the inner surface of outer side wall 224 of base 220 and is pressed axially against one side surface of pole 230 by bull-nose extension 257 of rotor cap 252. The rounded end of bull-nose 257 compresses washer seal 314 axially with sufficient force to provide a good seal to substantially prevent escape of magnetic particles 310 with minimal drag imparted to the rotation of shaft 232 and rotor cap 252. Washer seal 316 is pressed axially against enlarged cylindrical portion 290 of shaft 234 and radially is confined between cylindrical portion 307 of member 306 and the section of shaft 234 immediately adjacent portion 290. The rounded end of bull-nose extension 250 compresses washer 316 axially with sufficient force to provide a good seal to substantially prevent the escape of magnetic particles 310 with minimal drag imparted to the rotation of output shaft 234. As mentioned earlier the preferred shape of the end of bull-nose extensions 250 and 257 is rounded, since the smaller the surface area engaging the washer seals, the less the rotational drag. However, other end configurations for the bull-nose extensions would also be operative.

The operation of the assembly 200 shown in FIG. 2 is substantially the same as that shown in FIG. 1 except for the fact that the annular portion 308 of member 306 serves as part of the clutch unit as described while the cylindrical portion 307 of member 306 serves as part of the brake unit as described. Energizing coil 270 establishes magnetic flux through stator ring 260, rotor cap 252, the magnetic particles 310, annular portion 308 of magnetic coupling member 306 and shaft 232, with the result that output shaft 234 is magnetically clutched to shaft 232. When coil 270 is deenergized and coil 228 is energized, a magnetic flux circuit is established through the walls of base 220, stator ring 230, magnetic particles 310 and the cylindrical portion 307 of coupling member 306, with the result that output shaft 234 is magnetically coupled to the base and, since the base cannot rotate relative to the housing, shaft 234 is braked against movement while shaft 232 is still free to rotate.

It is to be noted that seal 114 is sized so as to be frictionally gripped by member 38 and seal 116 is sized so as to be frictionally gripped by members 91, 106 and 20, so that the bull-nosed sections 61 and 88 will rotate relative to them. Seal 314 is similarly gripped by member 224 and seal 316 by members 290, 306 and 234. The seals also may be fixedly attached to such members by a cement or other suitable fastening means.

It is to be understood that the invention is not limited in its application to the details of construction and arrangement of parts specifically shown or described and that within the scope of the appended claims, it may be practiced otherwise than as specifically shown or described.

What is claimed is:

1. A magnetic particle clutch-brake device comprising:
   a rotatable shaft having a single magnetic coupling member mounted thereon for rotation therewith, said member comprising a hollow cylindrical portion that is coaxial with said shaft and an annular portion that extends radially of said cylindrical portion;
   a brake unit including a stationary magnetic armature and one of said portions of said coupling member;
   a clutch unit including a rotor and a stator and the other of said portions of said coupling member, said rotor being rotatable with respect to said stator and said stator being stationary relative to said armature;
   a first drive coil for establishing magnetic flux through said armature and said one portion of said coupling member, said first drive coil being held stationary with respect to said armature;
   a second drive coil for establishing magnetic flux through said rotor and stator and said other portion of said coupling member, said second drive coil being held stationary with respect to said stator;
   said coupling member disposed so as to provide a first space between said one portion thereof and said armature and a second space between said other portion thereof and said rotor, said spaces being filled with magnetic particles; and
   sealing means for substantially preventing said magnetic particles from escaping from said space.

2. A device as set forth in claim 1 wherein said spaces communicate with each other to form a single large space.

3. A device as set forth in claim 1 wherein:
   said brake unit includes said annular portion of said member; and said clutch unit includes said cylindrical portion of said member.

4. A device as set forth in claim 1 wherein:
   said brake unit includes said cylindrical portion of said member; and said clutch unit includes said annular portion of said member.

5. A device as set forth in claim 1 wherein said coupling member is L-shaped in longitudinal section, and said cylindrical portion forms the longest leg of said L-shaped section.

6. A device as set forth in claim 1 wherein said annular portion is at one end of said cylindrical portion.

7. A device according to claim 1 wherein the outer diameter of said annular portion is greater than the outer diameter of said cylindrical portion.

8. A device as set forth in claim 1 wherein said annular portion is positioned substantially orthogonally with respect to said axis of rotation.

9. A device as set forth in claim 2 wherein said sealing means comprises only two sealing members for completely sealing said space.

10. A device as set forth in claim 9 wherein one of said sealing members engages said rotor and the other of said sealing members engages said armature.

11. A device as set forth in claim 9 wherein each of said sealing members comprises a compressible washer.

12. A device as set forth in claim 9 wherein each of said sealing members comprises a compressible washer with one of said washers being pressed between a portion of said rotor and a portion of said armature and the other of said washers is pressed between a portion of said rotor, said shaft, and said coupling member.

13. In a combination magnetic particle clutch-brake device having rotatable input and output shafts, a brake unit for braking one of said shafts including a stationary magnetic armature, a clutch unit for clutching said shafts together including a rotor which forms part of one of said shafts and a stator within which said rotor is rotatably mounted, said stator being stationary with respect to said armature, and first and second energizeable coils for generating magnetic flux for operating said brake and clutch units respectively, said coils being stationary with respect to said armature and stator, the improvements comprising:

a single magnetic coupling member mounted on the other of said shafts for rotation therewith, said coupling member comprising an annular portion and a cylindrical portion, said armature and said rotor being spaced from and cooperating with said coupling member so as to define a space therebetween, magnetic particles in said space, said first coil and one portion of said coupling member being disposed so that when energized said first coil will establish one magnetic flux path via said particles through said armature and said one portion of said coupling member for braking said other shaft, and said second coil and the other portion of said coupling member being disposed so that when energized said second coil will establish another magnetic flux path via said particles through said rotor and stator and said other portion of said coupling member so as to clutch said shafts to one another, and means for sealing said space to substantially prevent said magnetic particles from escaping from said space.

14. A combination magnetic particle clutch and brake device comprising:

a rotatable shaft having a single magnetic coupling member mounted thereon for rotation therewith, said member comprising a hollow cylindrical portion that is coaxial with said shaft and an annular portion that extends radially of said cylindrical portion;

a brake unit including a stationary magnetic armature and one of said portions of said coupling member, said armature having a bull-nosed portion;

a clutch unit including a rotor and a stator and the other of said portions of said coupling member, said stator being stationary relative to said armature and said rotor having a bull-nosed portion;

a first drive coil for establishing magnetic flux through said armature and said one portion of said coupling member;

a second drive coil for establishing magnetic flux through said rotor and stator and said other portion of said coupling member;

said coupling member disposed so as to provide a first space between said one portion thereof and said armature and a second space between said other portion thereof and said rotor, said spaces being filled with magnetic particles; and two sealing washers, one of said washers being compressed against a portion of said stator by said bull-nosed portion of said rotor and the other of said washers being pressed against a portion of said shaft and a portion of said member by said bull-nosed portion of said armature, said sealing washers serving to completely seal said space to prevent the escape of said magnetic particles from said space.

15. A magnetic particle clutch-brake device comprising:
a housing;
an input shaft and an output shaft each rotatably supported within said housing;
a clutch unit for clutching said shafts together, said clutch unit including a magnetic rotor on and rotatable with one of said shafts and means in said housing defining a magnetic stator in spaced surrounding relation to said rotor, said rotor having a pair of spaced poles;
a brake unit for braking the other of said shafts, said brake unit including means in said housing defining a stationary magnetic core with a pair of spaced poles;
a magnetic coupling member carried by and rotatable with said other shaft, said coupling member comprising a first portion extending between and spaced from the poles of said rotor and a second portion extending between and spaced from the poles of said core;

magnetic particles in the spaces between said coupling member and the poles of said rotor and said core;

sealing means for preventing escape of said magnetic particles from said spaces;

a first coil mounted to said stator for establishing magnetic flux through said stator, said rotor poles, said first portion of said coupling member and said particles so as to clutch said shafts to one another; and a second coil mounted to said core for establishing magnetic flux through said core poles, said second portion of said coupling member and said particles so as to brake said other shaft.

16. A magnetic particle clutch-brake device according to claim 15 wherein the members of one of said pairs of poles are spaced axially of said housing and the members of the other of said pairs of poles are spaced radially of said housing.

17. A magnetic particle clutch-brake device according to claim 15 wherein one shaft is hollow and said other shaft is rotatably mounted within said one shaft.

18. A device as set forth in claim 14 wherein:

said bull-nosed portions each has a substantially rounded end which bears against the corresponding washer with sufficient force to seal said space against particle escape while permitting said rotor to rotate.

As is apparent from the preceding discussion, the applicant's unique acoustic beacon produces (1) a short pulse at a single frequency, (2) an interval of signal at two precisely spaced single frequency components, and (3) an interval of silence. This signal has been found to have characteristics which make it particularly well suited for use in a highly accurate acoustic position reference system. Although a specific embodiment of apparatus for producing the specified signal is shown for illustrative purposes, other embodiments which do not depart from the applicant's contemplation and teaching will be apparent to those skilled in the art. The applicant does not wish to be limited to the disclosed embodiment, but only by the terms of the appended claims.

I claim:

1. An acoustic beacon for transmitting a periodic amplitude modulated signal comprising:

modulator means operable to produce a signal characterized by a first frequency amplitude modulated by a second frequency;

timer means connected to said modulator means and operable to periodically interrupt modulation of the first frequency so that said modulator means produces a periodic output signal, each period of which comprises a first interval of the first frequency followed by a second interval of the first frequency modulated by the second frequency;

acoustic projector means; and driving means connected to said modulator means and said acoustic projector means so as to energize said acoustic projector means in response to the periodic output signal.

2. The beacon of claim 1 wherein said timer means includes means for periodically blanking the output of said modulator means so that each period of the output signal produced thereby includes a third interval of silence, whereby said acoustic projector is caused to transmit a periodic acoustic signal in which each period successively comprises a first interval of the first frequency, a second interval of the first frequency modulated by the second frequency and a third interval of silence.

3. Signal modulation apparatus for use in an acoustic beacon comprising:

a first oscillator for producing a first signal having a frequency $f_1$;

a second oscillator for producing a second signal having a frequency $f_2$;

a modulator connected to said first and second oscillators so as to receive the first and second signals therefrom, said modulator being operable to produce a modulated signal whose predominant frequency components are $f_1 - f_2$ and $f_1 + f_2$; and timer means connected to said modulator for periodically interrupting modulation of the first signal, whereby said modulator produces a periodic output signal, each period of which comprises a first interval of signal whose frequency is $f_1$ followed by a second interval of signal whose predominant frequency components are $f_1 - f_2$ and $f_1 + f_2$.

4. The apparatus of claim 3 wherein said timer means is operable to periodically blank the signal produced by said modulator so that each period of the modulated signal includes a third interval of silence.

* * * * *